United States Patent [19]

Sokolsky et al.

[11] 3,862,054

[45] Jan. 21, 1975

[54] ADSORBENT FOR PURIFYING VEGETABLE OILS FROM PHOSPHORUS CONTAINING COMPOUNDS

[76] Inventors: Dmitry Vladimirovich Sokolsky, prospekt Abaya, 31, kv. 38; Kair Akhmetovich Zhubanov, prospekt Abaya, 34, kv. 27; Ninel Fedorovna Shumateva, ulitsa Furmanova, 120, kv. 29; Evgeny Petrovich Mazin, ulitsa Spartaka, 14, kv. 4; Aida Moiseevna Sokolskaya, prospekt Abaya, 31, kv. 38, all of Alma-ata, U.S.S.R.

[22] Filed: May 26, 1972

[21] Appl. No.: 257,402

[52] U.S. Cl. ............ 252/455 R, 252/457, 252/463, 260/427
[51] Int. Cl. .................... B01j 11/40, B01j 11/06
[58] Field of Search ............... 252/457, 455 R, 463; 260/427

[56] References Cited
UNITED STATES PATENTS

| | | | |
|---|---|---|---|
| 1,574,363 | 2/1926 | Calvert | 252/457 |
| 1,943,584 | 1/1934 | Cross | 252/457 X |
| 2,363,876 | 11/1944 | LaLande, Jr. | 252/457 |
| 2,395,931 | 3/1946 | LaLande, Jr. | 252/463 |
| 2,608,566 | 8/1952 | Marmor et al. | 260/427 |
| 3,231,390 | 1/1966 | Hoover | 260/427 X |

*Primary Examiner*—C. Dees
*Attorney, Agent, or Firm*—Waters, Roditi, Schwartz & Nissen

[57] ABSTRACT

A granulated composition comprising 5 to 50 percent of a metal oxide of Group II or of Group III of the Periodic Table, or a mixture thereof, and 10 to 40 percent by weight of a cement which is heatresistant at 500°C and above, and 10 to 85 percent by weight of alumina or a clay free from iron oxides. The adsorbent is prepared by mixing an aqueous solution of a salt of said metals with an aqueous soda or alkali solution while simultaneously depositing, with stirring, the resulting carbonates or hydroxides of said metals onto the alumina or clay. The coated filler is separated to give a paste-like mass which is mixed, with stirring with the cement and water granulated, dried at 20° to 150°C and calcined at a temperature of from 300° to 500°C. The adsorbent may be regenerated quite easily and has a high mechanical strength up to 150 kg/cm². The use of this adsorbent for the purification of vegetable oils makes it possible to reduce by 500 times the usual adsorbent consumption, eliminate separating oils from the adsorbent by filtration, and increase by 2 to 2.5 times the service life of catalysts employed in hydrogenation of oils.

3 Claims, No Drawings

3,862,054

ADSORBENT FOR PURIFYING VEGETABLE OILS FROM PHOSPHORUS CONTAINING COMPOUNDS

The present invention relates to adsorbents for the purification of vegetable oils such as soya-bean oil, sunflower oil, cotton-seed oil from phosphorus-containing compounds and free fatty acids, and to processes for producing such adsorbents.

These adsorbents are useful in the production of refined vegetable oils as commercial products of food industry and in the production of purified oil to be further treated so as to obtain solid fats by way of hydrogenation. In this latter case it is very important to purify vegetable oils from phosphorus-containing compounds and fatty acids, since phosphatides and other phosphorus-containing compounds have a poisoning effect on hydrogenation catalysts, while fatty acids exert a passivating action on the catalyst surface, whereby metal soaps are formed. This results in lowering the hydrogenation catalyst activity and reducing the service life thereof. Therefore, preliminary (prior to hydrogenation) purification of vegetable oils from phosphorus-containing compounds and free fatty acids will make it possible to eliminate the detrimental effect of said substances and considerably increase the service life of expensive hydrogenation catalysts.

Adsorbents for the purification of vegetable oils from phosphorus-containing compounds and free fatty acids by selective adsorption of said comtaminants are known. These adsorbents comprise powders of sulfuric acid-activated clays, tripolis, diatomites.

Said adsorbents are difficult to regenerate, whereby they are used only once in the purification of vegetable oils. This results in an elevated adsorbent consumption (1 to 5 percent based on the oil weight). Said adsorbents are employed, for purification of vegetable oils, in the form of a suspension, thus necessitating separation of oils from the adsorbent, which procedure is usually performed by filtration.

Due to the above-mentioned factors, the process of purification of vegetable oils using prior art adsorbents involves considerable exploitation costs which make this process economically inefficient.

It is an object of the present invention to provide an adsorbent which can be repeatedly used in the process of purifying vegetable oils from phosphorus-containing compounds and free fatty acids.

Another object of the present invention is to provide an adsorbent which makes it possible to purify vegetable oils avoiding the stage of separation of oils from the adsorbent by filtration.

These and other objects have been accomplished by providing a granulated adsorbent which consists of 5 to 50 percent by weight of an oxide of a metal pertaining to Group II of the Periodic Table or an oxide of a metal pertaining to Group III of the Periodic Table, or a mixture of metal oxides of Group II and/or Group III of the Periodic Table, and 10 to 40 percent by weight of a cement which is heat-resistant at 500°C or more, and 10 to 85 percent by weight of alumina or a clay free from iron oxides.

The adsorbent according to the present invention is easily regenerated by washing with a 20–75 percent aqueous alkali solution (NaOH, KOH) or 10 percent aqueous solution of a synthetic detergent. Adsorbent granules have a high mechanical strength (up to 150 kg/cm$^2$). Owing to such properties, the adsorbent may be repeatedly used in a process of purifying vegetable oils; the adsorbent consumption is insignificant (not more than 0.01 percent by weight of the oil to be treated). In addition, the use of an adsorbent in the form of granules makes it possible to avoid the stage of separating oils from the adsorbent by filtration.

Therefore, the use of the adsorbent according to the present invention renders the process economically efficient.

The adsorbent thus described may be prepared by a process which comprises, according to the present invention, mixing a 10–20 percent aqueous solution of a sulfate, nitrate, or chloride of a Group II metal, or a sulfate, nitrate, or chloride of a Group III metal, or a mixture of the above salts of Group II and/or Group III metals of the Periodic Table, with a 10–20 percent aqueous solution of soda or an alkali, with simultaneously precipitating, under stirring, the resulting carbonates or hydroxides of said metals onto a filler such as alumina or a clay free from iron oxide taken in an amount of 10 to 85 percent based on the total weight of the adsorbent. Then, the filler with carbonates or hydroxides of said metals deposited thereon is separated from the aqueous solution to give a paste-like mass. The latter is added, under stirring, with a binder, viz., a cement which is heat-resistant at 500°C and more in an amount of 10 to 40 percent based on the total weight of the adsorbent, and water in an amount of 30 to 100 percent by weight of the cement. The resulting mixture is granulated. The granules are dried at a temperature within the range of from 20° to 150°C and calcined at a temperature within the range of from 300° to 500°C.

The following sequence of technological steps is most advantageous in the process of preparing the adsorbent according to the present invention.

A calculated amount of a salt of one of the above-said metals or a mixture of metal salts of Group II and/or Group III of the Periodic Table is charged into a vessel and added, under stirring, with water taken in an mount sufficient to obtain a 10–20 percent concentrated solution. Thereafter, into the same vessel a filler such as alumina or clay is introduced in an amount of 10 to 85 percent based on the total weight of the adsorbent. Further, a calculated amount of a 10–20 percent aqueous solution of soda or an alkali (NaOH, KOH, NH$_4$OH) is added, with stirring. The resulting carbonates or hydroxides of said metals are deposited onto the filler. The latter, along with the compounds deposited thereon, is separated from the aqueous solution by decantation or filtration to yield a paste-like mass. This mass is washed with water until SO$_4^{--}$, Cl$^-$, and NO$_3^-$ ions are eliminated, whereafter it is mixed with a binder, viz., a cement which is heat-resistant at a temperature of 500°C and above in an amount of 10 to 40 percent by weight based on the total weight of the adsorbent, and water in an amount of 30 to 100 percent by weight of the cement. The mixture is granulated using a band- or plate-granulator to produce cylindrical granules of 2 × 2 to 10 × 10 mm in size. The granules are dried at a temperature within the range of from 20° to 150°C and calcined at a temperature within the range of from 300° to 500°C.

An adsorbent in the form of dark-gray or dark-brown granules is thus produced which has a high mechanical strength and is capable of operating for a long period (at least 200 days) in a medium of vegetable oils possessing a constant adsorption ability.

The purification of vegetable oils from phosphorus-containing compounds and free fatty acids using the granulated adsorbent prepared in accordance with the above-said process is performed in the following manner.

A stainless-steel vessel is filled with the adsorbent, heated to a temperature of from 50° to 120°C and an oil is passed therethrough at a space velocity of 0.5 to 2 volumes of oil per 1 volume of the adsorbent/hr. A chosen space velocity value depends on the purity grade of the oil and the required purification degree. With increasing space velocity there is an increase in the oil purification rate, while the purification degree is lowered, and vice versa, with decreasing space velocity there is a decrease in the oil purification rate, while the purification degree is increased. Therefore, the oil purification process may be rather easily controlled in this manner.

The adsorbent activity is determined by analyzing the amount of phosphatides and free fatty acids in the oil to be purified. If the amount of said substances in the oil is not reduced and the required purification degree is not yet attained it is necessary to perform the adsorbent regeneration. This step comprises washing the adsorbent with a 20 to 75 percent aqueous caustic soda or caustic potash solution or 10 percent solution of a synthetic detergent until complete discoloration of the solution is observed. Then the adsorbent is washed with water to neutral pH and dried at a temperature of from 120° to 180°C until water vapor evolution is completed.

The use of the granulated adsorbent according to the present invention for the purification of vegetable oils from phosphorus-containing compounds and free fatty acids makes it possible to reduce by 500 times the adsorbent consumption compared with the prior art powder-like adsorbents and eliminate a labor-consuming operation of separating oils from the adsorbent by filtration. The purification of oils on the adsorbent according to the present invention enables increasing by 2 to 2.5 times the service life of catalysts used in the hydrogenation of said oils.

The following examples illustrating the process of preparation of the adsorbent and the use thereof for purifying vegetable oils are given hereinbelow for better understanding of the present invention.

EXAMPLE 1

100 g. of anhydrous aluminum sulfate were charged into a reaction vessel, dissolved in 900 ml. of water, and then mixed with 1.156 g. of technical purity grade alumina. The mixture was stirred until a uniform slurry was produced, whereafter 2,400 ml. of a 10% aqueous soda solution were poured into the vessel, still under stirring. The resulting aluminum carbonate was deposited onto the alumina. The latter, along with aluminum carbonate deposited thereon, was filtered off to give a paste-like mass. This mass was washed with water until the complete elimination of $SO_4^{--}$ ions, whereafter it was mixed, with stirring, with 136 g. of a cement which is heat-resistant at 500°C, and 136 ml. of water. The mixture thus obtained was granulated to give cylindrical granules of 5 × 5 mm. size. The resulting granules were dried at a temperature of 20°C during 2 days. Then the temperature was gradually, increased up to 120°C over a period of 12 hours and the granules were maintained at this temperature for an additional 12 hours. The granules thus dried were placed in a crucible furnace, wherein they were maintained for 3 hours while gradually elevating the temperature from 300° to 500°C.

1,360 g. of a granulated adsorbent were thus obtained. It consisted of 5 percent by weight of aluminum oxide, 85 percent by weight of technical grade alumina, and 10 percent by weight of a heat-resistant cement.

The resulting adsorbent was used for the purification of sunflower oil having an acidic value of 0.3 mg. KOH/100 g. of the oil. The purification was performed at a temperature of 120°C, supplying the oil at a space velocity of 2 hr.$^{-1}$. Such purification resulted in complete elimination of phosphorus-containing compounds, while the content of free fatty acids was reduced by 50 percent (the purified oil has an acidic value of about 0.15 mg. KOH/100 g. of the oil).

EXAMPLE 2

100 g. of anhydrous barium sulfate were charged into a reaction vessel, dissolved with 900 ml. of water, and mixed with 726 g. of bentonite clay free from iron oxides. The mixture was stirred until a uniform slurry was obtained, whereafter, still under stirring, 1,530 ml. of a 10 percent aqueous soda solution was added into the vessel. The resulting barium carbonate was deposited onto the clay. The latter, along with barium carbonate deposited thereon, was filtered off to give a paste-like mass which was washed with water until the complete elimination of $SO_4^{--}$ ions, whereafter 528 g. of a cement which is heat-resistant at 500°C and 200 ml. of water were added thereto. The resulting mixture was granulated to give cylindrical granules of 5 × 5 mm. size. The granules were dried at a temperature of 20°C for a period of two days. Then the temperature was gradually increased up to 150°C during a period of 12 hours and the granules were maintained at this temperature for an additional 12 hours. The dried granules were calcined in much the same manner as described in Example 1.

1,320 g. of a granulated adsorbent were thus obtained. The product consisted of 5 percent by weight of barium oxide, 55 percent by weight of bentonite clay, and 40 percent by weight of a heat-resistant cement.

The resulting adsorbent was used for the purification of sunflower oil having an acidic value of 0.3 mg. KOH/100 g. of the oil. The purification was performed at a temperature of 90°C supplying the oil at a space velocity of 2 hr.$^{-1}$ This purification resulted in complete elimination of phosphoruscontaining compounds, while the content of free fatty acids was reduced by 30 percent (the purified oil has an acidic value of about 0.2 mg. KOH/100 g. of the oil).

EXAMPLE 3

120 kg. of anhydrous magnesium sulfate and 15 kg. of anhydrous aluminum sulfate were charged into a reaction vessel, dissolved in 1,200 l. of water and mixed with 150 kg. of technical grade alumina. The resulting mixture was agitated until a uniform slurry was obtained and then, still under agitation, was mixed with 910 l. of a 10 percent aqueous ammonia solution. Magnesium hydroxide and aluminum hydroxide were deposited on the alumina. The latter, along with the hydroxide deposited thereon, was filtered off the aqueous solution to give a pastelike mass. Said mass was washed with water until the complete elimination of $SO_4^{--}$ ions, whereafter 50 kg. of a cement which is heatresistant at 500°C and 50 l. of water were admixed thereto. The resulting mixture was granulated, dried, and calcined in accordance with the procedure described in Example 1.

250 g. of a granulated adsorbent were thus obtained. The product consisted of magnesium oxide (16 percent by weight), aluminum oxide (4 percent by weight), technical grade alumina (60 percent by weight), and 20 percent by weight of a heat-resistant cement.

The resulting adsorbent was used for the purification of 3,600 tons of sunflower oil and cotton-seed oil of various lots having acidic values within the range of from 0.2 to 0.5 mg. KOH/100 g. of oil. The purification was conducted at a temperature of 90°C supplying the oil at various space velocities (of from 0.5 to 2 hr.$^{-1}$). As a result of such purification, phosphorus-containing compounds were completely eliminated, while the content of free fatty acids was reduced by 18 percent on the average.

EXAMPLE 4

200 g. of aluminum chloride and 1 g. of boron chloride were introduced into a reaction vessel and dissolved in 800 ml. of water, whereafter 9 g. of bentonite clay free from iron oxides was added. The mixture was stirred until a homogeneous slurry was formed and then was mixed with 2,000 ml. of a 20 percent solution of caustic soda, still under stirring. The resulting aluminum hydroxide and boron hydroxide were deposited onto the clay. The latter, along with the hydroxides deposited thereon, was filtered off the aqueous solution to give a paste-like mass. This mass was washed with water until the complete elimination of chlorine ions, and then was mixed, under stirring, with 35 g. of a heat-resistant cement and 21 ml. of water. The resulting mixture was granulated, dried and calcined in accordance with the procedure described in Example 1.

88 g. of a granulated adsorbent were thus produced. The product contained about 42 percent by weight of aluminum oxide, about 8 percent by weight of boron oxide, 10 percent by weight of bentonite clay, and 40 percent of a heat-resistant cement.

The resulting adsorbent was used for the purification of soya-bean oil having an acidic value of 1 mg.KOH/100 g. of the oil. The purification was carried out at a temperature of 90°C supplying the oil at a space velocity of 0.5 hr.$^{-1}$ As a result of the purification, phosphorus-containing compounds were eliminated to an extent as high as 80 percent, while the content of free fatty acids was reduced by 20 percent.

EXAMPLE 5

150 g. of calcium nitrate were charged into a vessel, dissolved in 850 ml. of water, whereafter 200 g. of tripoli earth were added thereto. The mixture was stirred until a uniform slurry was obtained and then, still under stirring, 850 ml. of a 15 percent aqueous caustic potash solution were added thereto. The resulting calcium hydroxide was deposited on the tripoli earth. The latter, along with the calcium hydroxide deposited thereon was filtered off the aqueous solution to give a paste-like mass. This mass was washed with water until the complete elimination of $NO_3^-$ ions, whereafter it was mixed, with stirring, with 150 g. of a cement which is heat-resistant at 500°C, and 90 ml. of water. The resulting mixture was granulated, dried, and calcined in accordance with the procedure described in Example 1.

500 g. of a granulated adsorbent were thus obtained. It consisted of 30 percent by weight of calcium oxide, 40 percent by weight of tripoli, earth, and 30 percent by weight of a heat-resistant cement.

The resulting adsorbent was used for the purification of sunflower oil and cotton-seed oil of various lots having an acidic value of 0.3 mg. KOH/100 g. of the oil. The purification was performed at a temperature of 90°C, supplying the oil at a space velocity of 2 hr.$^{-1}$ As a result of the purification, phosphorus-containing compounds were eliminated completely, while the content of free fatty acids was reduced by 30 percent.

We claim:

1. A process for preparing an adsorbent for purifying vegetable oils from phosphorus-containing compounds and free fatty acids by selective adsorption of said contaminants, comprising mixing a 10–20 percent aqueous solution of a metal salt selected from the group consisting of sulfates, nitrates, and chlorides of metals of Groups II and III of the Periodic Table, and mixtures thereof, with a 10–20 percent aqueous solution of an alkaline compound selected from the group consisting of soda, sodium hydroxide, potassium hydroxide and ammonia; depositing the resulting compounds selected from the group consisting of carbonates and hydroxides of said metals, with stirring, onto a filler in an amount of from 10 to 85 percent based on the total weight of the adsorbent and selected from the group consisting of alumina and a clay free from iron oxides; separating the filler with said compounds deposited thereon from aqueous solution to give a paste-like mass; adding thereto a binder, said binder being a cement which is heat-resistant at 500°C and above in an amount of 10 to 40 percent based on the total weight of the adsorbent, and water in an amount of 30 to 100 percent based on the weight of the cement; granulating the resulting mixture; drying the granules at a temperature of from 20° to 150°C, and calcining the granules at a temperature of from 300° to 500°C.

2. A process according to claim 1 wherein the reaction between the metal salt and soda or alkali takes place in the presence of the filler.

3. The product obtained by the process of claim 1.

* * * * *